(12) United States Patent
Berghoff et al.

(10) Patent No.: US 7,195,116 B2
(45) Date of Patent: Mar. 27, 2007

(54) LINK CHAIN

(75) Inventors: Jürgen Berghoff, Holzwickede (DE); Thorsten Wirtz, Hilden (DE)

(73) Assignee: J.D. Theile Gmbh & Co. KG, Schwerte (DE)

( * ) Notice: Subject to any disclaimer, the term of this patent is extended or adjusted under 35 U.S.C. 154(b) by 0 days.

(21) Appl. No.: 11/214,300

(22) Filed: Aug. 29, 2005

(65) Prior Publication Data

US 2006/0053766 A1 Mar. 16, 2006

(30) Foreign Application Priority Data

Sep. 10, 2004 (DE) .................. 20 2004 014 062
Nov. 25, 2004 (DE) .................. 10 2004 057 047

(51) Int. Cl.
*B65G 17/38* (2006.01)

(52) U.S. Cl. .......................... 198/850; 59/84

(58) Field of Classification Search ........... 198/850, 198/851; 59/78, 80, 82, 84, 90; 474/206, 474/214–217, 227
See application file for complete search history.

(56) References Cited

U.S. PATENT DOCUMENTS

| | | | | |
|---|---|---|---|---|
| 2,103,972 | A | * | 12/1937 | Harris .......................... 59/84 |
| 3,457,721 | A | * | 7/1969 | Trudeau ...................... 198/850 |
| 3,664,121 | A | * | 5/1972 | Camitz ......................... 59/84 |
| 3,864,906 | A | * | 2/1975 | Cullen ......................... 59/84 |
| 4,216,070 | A | * | 8/1980 | Debost ......................... 59/84 |
| 5,778,655 | A | | 7/1998 | Lange | |

FOREIGN PATENT DOCUMENTS

| | | |
|---|---|---|
| DE | 17 58 988 | 3/1971 |
| DE | 82 12 524 | 8/1982 |
| DE | 82 35 292 | 5/1983 |
| DE | 34 45 002 | 7/1985 |
| DE | 91 12 477 | 12/1991 |
| DE | 29 607 544 | 7/1996 |
| GB | 2114262 | 8/1983 |
| GB | 2407141 | 4/2005 |

* cited by examiner

Primary Examiner—James R. Bidwell
(74) Attorney, Agent, or Firm—Collard & Roe, P.C.

(57) ABSTRACT

A link chain has multiple individual chain links arranged in a repeating sequence. A first chain link has two shank portions connected by two arc portions which define an interior space. One or more dividing elements project inwardly from an inside surface of a shank portion and divide the interior space into two movement spaces. A second chain link has two shank portions connected by two arc portions which define a movement space within its interior. The second link is linked to the first link and movable within one of its two movement spaces. When a longitudinal axis of the second chain link is moved from an intended, substantially aligned position by less than 90 degrees, an outside of an arc portions of the second chain link that engages a movement space of the first chain link contacts the dividing element, and an inside of a shank portion of the second chain link contacts an arc portion of the first chain link.

6 Claims, 1 Drawing Sheet

LINK CHAIN

CROSS REFERENCE TO RELATED APPLICATIONS

Applicants claim priority under 35 U.S.C. §119 of GERMAN Application No. 20 2004 014 062.4 filed on Sep. 10, 2004 and GERMAN Application No. 10 2004 057 047.7 filed on Nov. 25, 2004.

BACKGROUND OF THE INVENTION

1. Field of the Invention

The invention relates to a link chain formed of a sequence of individual, consecutive chain links linked with one another. More particularly, the invention relates to a link chain having an arrangement which prevents or minimizes misalignment of the link chain.

2. The Prior Art

Link chains consist of a plurality of individual chain links linked with one another. In the case of link chains for industrial applications, such as, for example, a hoist chain for use in underground coal mining, the individual chain links are subjected to extremely high tensile stress.

A link chain demonstrates its maximum ability to withstand tensile stress when the individual chain links are disposed one after the other in an intended manner such that the inside portions of two facing arcs of two consecutive chain links rest against one another. The rated ability of a link chain to withstand stress regularly presupposes that the chain links of the link chain that is subject to the tensile stress are disposed, relative to one another, in the intended manner described above.

However, if individual chain links are not located in their intended arrangement, so that a second chain link linked into a first chain link borders on the arc of the first chain link not with the inside of its arc, but with the inside of its shank, for example, this chain link cannot withstand the rated stress. This chain link therefore forms a weak point of the link chain. When the chain is loose and not under tensile stress, the individual chain links can change position relative to one another, and remain in this arrangement relative to one another when the link chain is put under stress again. The link chain has then become misaligned. The misaligned chain links not only represent a weakening of the chain with regard to its ability to withstand stress, but also present a risk that the misaligned segments of the link chain will damage drive units for moving the chain, or will themselves be destroyed. For this reason, in underground coal mining, the link chains used for scoop bucket conveyors are typically pre-tensed and checked while the chain is hanging, before stress is put on them.

SUMMARY OF THE INVENTION

Proceeding from this state of the art as discussed, the invention is therefore based on the task of further developing a link chain of the type stated initially, in such a manner that the risk of misalignment is minimized, if not actually prevented entirely.

This task is accomplished, according to an embodiment of the invention, by means of a link chain, wherein the link chain comprises a plurality of individual chain links arranged in a repeating sequence comprising:

a first or vertical chain link having at least one dividing element that projects inwardly from an inside surface of the shank, reducing the clear inside diameter in the transverse direction, and dividing an interior space of the chain link into two movement spaces that are separate from one another, on at least one of its two shanks that connect the arcs with one another, and a second, or horizontal, chain link, which is linked into the first chain link, and is movable or can submerge into a movement space of the first chain link when the chain is loose.

The link chain has an intended position, wherein the longitudinal axis of the second chain link is substantially aligned with a longitudinal axis of the first chain link. As a result of an effective width of the dividing element, which is active to limit the movement spaces of the first chain link, and as a result of the outside contour, the diameter, and/or the inside length of the movement space of the second chain link into which the first chain link engages, when a longitudinal axis of the second chain link is moved from this intended position by less than approximately 90 degrees: (1) an outside of one of the two arc portions of the second chain link that engages one of two movement spaces of the first chain link contacts a dividing element, and (2) an inside of one of the two shank portions of the second chain link which is adjacent to a segment of the arc portions of the second chain link contacting the dividing element contacts the arc portions of the first chain link which forms the movement spaces of the first chain link.

The link chain consists of a repeating sub-sequence of two or three directly consecutive chain links. The chain links are coordinated with one another, with regard to the aforementioned characteristics, in such a manner that a displacement of a second chain link relative to a first chain link is possible, however; this displacement automatically resolves itself, i.e. straightens itself out, when a tensile stress is applied to the link chain. For this purpose, a first chain link has one or more, for example two, dividing elements that lie symmetrically opposite one another relative to the longitudinal axis. The one or more dividing elements divide the interior space of the first chain link (defined by its two arcs and two shanks) into two separate movement spaces.

The one or more dividing element(s) reduce the clear inside diameter of the chain link in a transverse direction, without, however, forming a continuous stay. Such a stay would reduce the long-term vibration resistance of the chain link. A subsequent chain link is linked into an associated movement space. The dividing elements can be in the form of projections or noses that project away towards the inside, from the shanks that connect the arcs of the first chain link. A movement space of the subsequent second chain link, linked into a movement space of the first chain link, has an effective inside length, into which the first chain link engages. Due to this inside length, and as a function of the configuration of the one or more dividing elements, particularly with regard to their width, the segment of the second chain link that is linked into the first chain link can submerge into the movement space of the first chain link only to such an extent that when the inside of a shank of the second chain link rests against the arc of the first chain link, the outside of the arc segment adjacent to this shank rests against the dividing element of the first chain link.

In the case of such a misaligned position, in which the longitudinal axis of the second chain link has been moved out of its aligned arrangement with the longitudinal axis of the first chain link by an angle of less than 90°, the second chain link automatically turns back to its intended position, in which it aligns with the longitudinal axis of the first chain link, when a tensile force acts on the link chain. The submersion depth of the second chain link, in the case of such a displacement, may depend on the effective inside width of the movement space of the first chain link into which the second chain link is linked, on the diameter of the second chain link, and on the effective inside length of the movement space of the second chain link into which the first chain link engages with its arc.

When designing a link chain according to an embodiment of the invention, the aforementioned variables can be coordinated with one another, as described in the following, in such a manner that a displacement of the second chain link will result in a releasable arrangement as described above, when the chain is loose. In the case of a predetermined division and a predetermined diameter of the chain links, the one or more dividing elements of the first chain link may be appropriately shaped and sized so that when a displacement of the second chain link, in the manner described above, occurs, at most the outside of the arc of the second chain link will make contact with it.

The arc of a subsequent third chain link, which is linked into the second chain link, may serve to limit the effective inside length of the movement space of the second chain link into which the first chain link engages. In the case of such a configuration, the diameter of the arc of the third chain link defines the freedom of movement of the second chain link. The effective inside length of the movement space of the second chain link, into which the first chain link engages, can also be formed by dividing elements projections, i.e. projections or noses that project away from the shanks that connect the arcs of the second chain link. It is also possible that this movement space is delimited by only one dividing element that projects away from the shank. The chain links of the sub-sequence can therefore be designed in the same fundamental manner.

In the case of a link chain in which the second chain link: 1) rests against the dividing element of the first chain link at most in a region of its outside arc that is linked into the first chain link; and at the same time 2) the inside of the straight shank adjacent to this arc segment rests against the arc of the first shank, when the second chain link is displaced, it will be brought into its intended position along a curved path, for example a circular path. Accordingly, in situations of the second chain link relative to the first chain link that are critical for misalignment, no stable two-point support of the second chain link on the first chain link, which would counteract straightening of the second chain link when a tensile stress is applied to the link chain, can occur, It is furthermore advantageous, for example, in an application wherein a link chain is used for a scoop bucket conveyor, that as a result of the dividing elements of the vertical chain links, possible submersion into a scoop bucket or a carrier of such a scoop bucket conveyor is effectively prevented.

BRIEF DESCRIPTION OF THE DRAWINGS

Other benefits and features of the present invention will become apparent from the following detailed description considered in connection with the accompanying drawings. It is to be understood, however, that the drawings are designed as an illustration only and not as a definition of the limits of the invention.

In the drawings, wherein similar reference characters denote similar elements throughout the several views.

DETAILED DESCRIPTION OF THE PREFERRED EMBODIMENT

Figure 1:
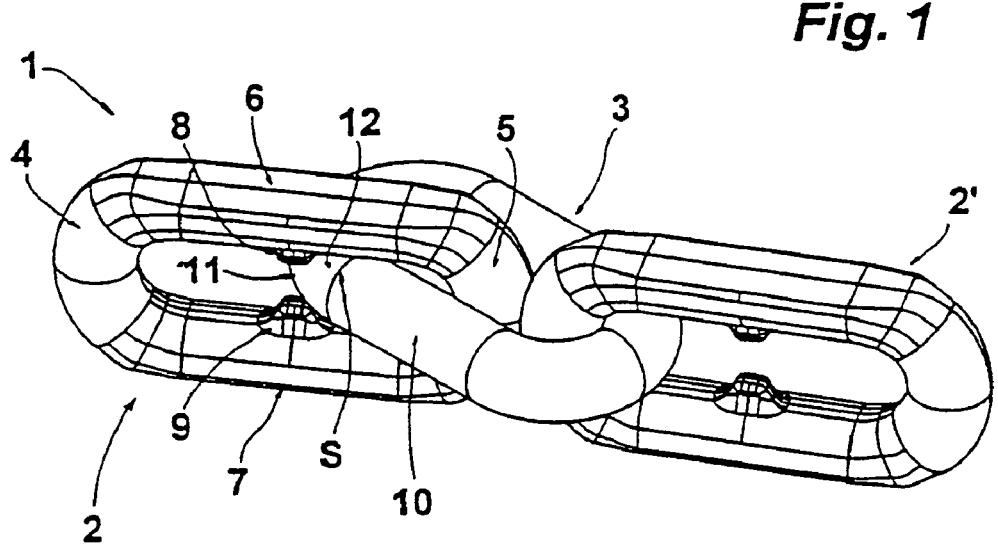
FIG. 1 shows a perspective schematic representation of a detail of a link chain according to an embodiment of the invention.

Referring now in detail to the drawings and, in particular, FIG. 1, a link chain 1 consists, in the exemplary embodiment shown, of first or vertical chain links 2, 2', structured as flat chain links, and second, or horizontal chain links 3 that connect two vertical chain links 2, 2' with one another, in each instance. FIG. 1 shows a sub-sequence of chain links of the link chain 1. This sub-sequence comprises a first chain link that is the vertical chain link 2 in the case of the exemplary embodiment shown. The inside length of the chain link 2 is divided into two movement spaces, separate from one another, by means of a dividing element, illustrated as projection or nose 8, 9 that projects away from shanks 6, 7 that connect arcs 4, 5 with one another. The projections or noses 8, 9 are formed at a slant to the arcs 4 or 5, respectively. This slant can also be curved, for example curved in a concave manner, to rest against the curved surface of second chain link 3. For this purpose, the distance between the two surfaces of the projections or noses 8, 9 that face one another may be smaller than the diameter of the horizontal chain link 3.

Second or horizontal chain link 3 follows first or vertical chain link 2 and is linked into a movement space of first chain link 2. The second chain link 3 has a single movement space into which the first chain link 2 engages with its arc 5, and into which a third chain link, shown as vertical chain link 2' following the second chain link 3, engages. The mobility of the second chain link 3 with reference to the first chain link 2 is therefore limited by an arc of subsequent third chain link 2', which also engages into the movement space of the second chain link 3.

Figure 2:
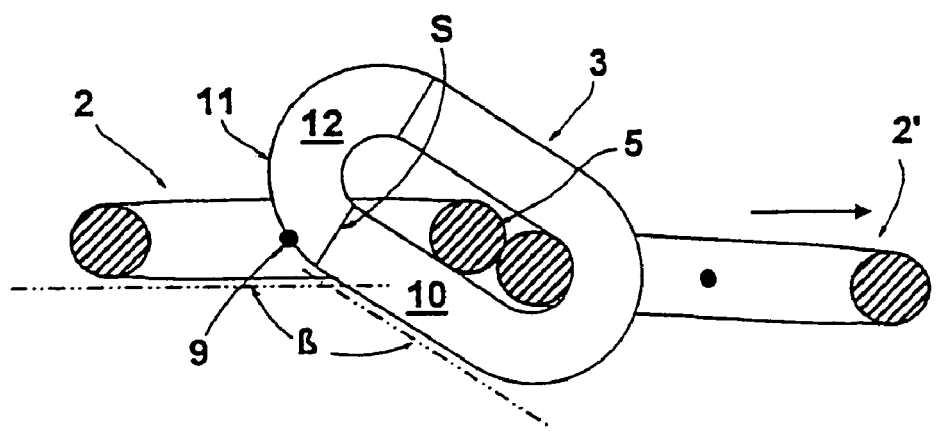
FIG. 2 shows a longitudinal cross-section representation through the arrangement of chain links shown in FIG. 1.

FIGS. 1 and 2 show the chain link sub-sequence in the case of a loose or hanging chain, in which horizontal chain link 3 has been moved out of an intended position wherein it is aligned with the longitudinal axis of the first chain link 2, and submerges into the movement space of chain link 2 with its segment that faces the chain link 2. The longitudinal axis of the second chain link 3 has been displaced by less than 90° relative to that of the first chain link 2, and encloses an obtuse angle β with the longitudinal axis of the first chain link 2.

In the arrangement of the chain links 2, 3, 2' relative to one another, as shown, the inside of one shank 10 of horizontal chain link 3 rests against the arc 5 of the first chain link 2. In this position shown in FIGS. 1 and 2, the outside 11 of the arc 12 of the horizontal chain link 3 furthermore rests against projection or nose 9 (shown only schematically in FIG. 2). What is significant is that contact between the second chain link 3 and the nose 9 of the first chain link, which serves as a dividing element, exists in the region of the outside 11 of the arc 12 of the chain link 3, before the transition of the arc 12 into the straight shank 10 that is adjacent to this arc segment. The transition of the curved outside 11 of the arc 12 to the straight outside of the shank 10 is indicated in FIG. 2 as the peak S.

When a tensile stress is applied to a link chain 1, comprising a sub-sequence as shown in the figures, chain link 3 is easily brought from a misaligned position as shown in FIGS. 1 and 2 into an intended position, in which its longitudinal axis aligns with the longitudinal axes of the two adjacent chain links 2, 2', and therefore the insides of the arcs of the linked chain links are adjacent to one another. Since an immersion depth of the second chain link 3 into the movement space of the first chain link 2 is limited by the arc of chain link 2' that engages into the movement space of the second chain link 3, the chain link 3 cannot be brought into contact against the outside of projections or noses 8, 9 with the straight outside of its shank 10. Accordingly, a linear movement at an angle to the tensile direction of the link chain to bring the chain link 3 into its intended arrangement relative to the adjacent chain links 2, 2' is not required in any displacement position of the second chain link 3 relative to the first chain link 2. The described link chain is therefore free of misalignment.

Figure 3:
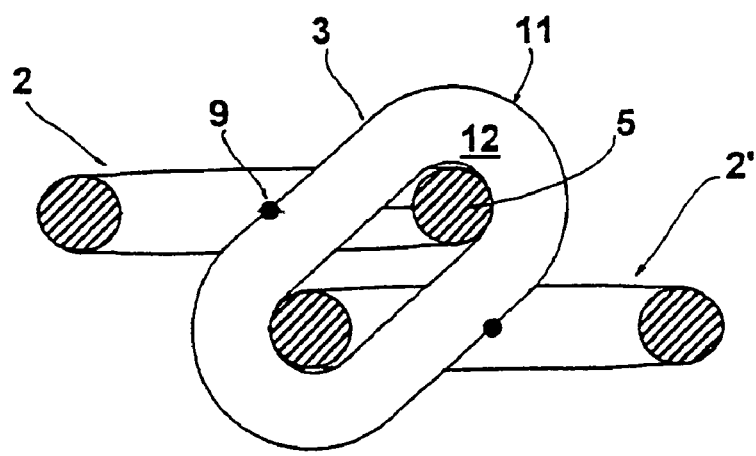
FIG. 3 shows a longitudinal cross-section representation through the chain links shown in FIG. 1, in another position of the chain links relative to one another.

This holds true not only for the situation shown in FIGS. 1 and 2, in which the angle of the displacement of the longitudinal axis of the second chain link 3 relative to that of the first chain link 2 is less than or equal to 90°, but also in cases of displaced positions of the second chain link 3, in which the two longitudinal axes enclose an angle β of less than 90°, as shown in FIG. 3.

In the arrangement of the chain links 2, 3, 2' relative to one another, the outside of the shank 10 rests against projections or noses 8, 9, thereby preventing a further displacement of second chain link 3 relative to first chain link 2. Therefore, the size of the smallest angle that the longitudinal axes of chain links 2, 3 can enclose can also be determined by means of projections or noses 8, 9 of first chain link 2 that act as a stop in the case of such a displacement.

When a tensile stress is applied to the link chain 1 in the case of an arrangement of the chain links 2, 3, 2' according to FIG. 3, the second chain link 3 moves like a hinge about the arc 5 of the first chain link 2, and accordingly also about the arc of the chain link 2' that is linked into the movement space of the second chain link 3. By means of the configuration of the chain links 2, 3 as described above, when chain link 3 is straightened out from its position shown in FIG. 3, contact between projections or noses 8, 9 that act as a stop in the case of such a displacement only occurs in the region of the outside 11 of the arc 12 of the second chain link 3.

In the case of the sub-sequence of chain links shown in the figures, the chain link 2' forms the first chain link for a further, subsequent horizontal chain link, not shown. In this manner, the sub-sequence repeats over the entire length of the link chain 1.

In an embodiment of a link chain 1 according to the invention, an individual chain link may have a division/diameter ratio of approximately four. The dividing elements, such as projections or noses 8, 9 come to rest, in the case of a linked second chain link 3 that is configured as a round chain link, only in its lateral surfaces, which are at a distance from the outer peaks. If two dividing elements, for example projections or noses 8, 9 are provided, which are symmetrically configured with regard to the center longitudinal plane of the first chain link, the shear forces transferred from the second chain link 3 to the first chain link 2 are furthermore uniformly absorbed in the case of a displacement, and introduced into the adjacent shanks 6, 7, in each instance. As a result the dividing elements may function in the manner of a previously known center stay, but the introduction of force under shear stress is improved. Furthermore, the long-term vibration resistance of the chain links shown is significantly greater than that of chain links having a stay that connects the two shanks.

From the description of the invention, it becomes clear that the horizontal chain links 3 are moved, relative to the vertical chain links 2, 2', into their intended position or arrangement relative to the adjacent chain links, from displaced positions relative to the adjacent vertical chain links, solely by means of hinge movements, either about a point of rotation or along a circular path.

Accordingly, while only one embodiment of the present invention has been shown and described, it is obvious that many changes and modifications may be made thereunto without departing from the spirit and scope of the invention.

REFERENCE SYMBOL LIST 1 link chain
2, 2' vertical chain link
3 horizontal chain link
4 arc
5 arc
6 shank
7 shank
8 dividing element or nose
9 dividing element or nose
10 shank
11 outside of arc
12 arc
S peak
β angle

What is claimed is:

1. A link chain comprising a plurality of individual chain links arranged in a repeating sequence, the sequence comprising:
   a) a first chain link comprising:
      i) two shank portions;
      ii) two arc portions connecting said two shank portions, wherein said two shank portions and said two arc portions define an interior space of said first chain link; and
      iii) at least one dividing element projecting inwardly from an inside surface of at least one of said two shank portions, wherein said at least one dividing element reduces a clear inside diameter of said interior space in a transverse direction and divides said interior space into two movement spaces; and
   b) a second chain link comprising:
      i) two shank portions and
      ii) two arc portions connecting said two shank portions, wherein said two shank portions and said two arc portions define a movement space within an interior of said second chain link;

wherein, said second link is linked to said first link and movable within one of said two movement spaces of said first chain link; and wherein, when a longitudinal axis of said second chain link is moved from an intended position, wherein said longitudinal axis is substantially aligned with a longitudinal axis of said first chain link, by less than approximately 90 degrees, an outside of one of said two arc portions of said second chain link that engages said one of said two movement spaces of said first chain link contacts said at least one dividing element, and an inside of one of said two shank portions of said second chain link which is adjacent to a segment of said one of said two arc portions of said second chain link contacting said at least one dividing element contacts one of said two arc portions of said first chain link which forms said one of said two movement spaces of said first chain link.

2. The link chain according to claim 1, wherein said at least one dividing element projecting inwardly from an inside surface of at least one of said two shank portions further comprises a first dividing element projecting inwardly from an inside surface of one of said two shank portions and a second dividing element projecting inwardly from an inside surface of another of said two shank portions, wherein said first dividing element and said second dividing element are symmetric with respect to a center longitudinal axis of said first chain link.

3. The link chain according to claim 1, wherein a depth of movement of said second chain link into said one of said two movement spaces of said first chain link is determined by an inside length of said movement space of said second chain link.

4. The link chain according to claim 3, wherein said depth of movement of said second chain link into said one of said two movement spaces of said first chain link is further determined by said at least one dividing element.

5. The link chain according to claim 1, wherein a depth of movement of said second chain link into said one of said two movement spaces of said first chain link is limited by a diameter of an arc of a third chain link linked to said second chain link.

6. The link chain according to claim 1, wherein said first chain link comprises a vertical chain link structured as a flat chain link and said second chain link comprises a horizontal chain link.

* * * * *